United States Patent [19]

Lutz

[11] 3,708,626

[45] Jan. 2, 1973

[54] SWITCHING CENTER FOR PCM- TIME MULTIPLEX TELEPHONE NETWORK

[75] Inventor: Karl Anton Lutz, Munich, Germany

[73] Assignee: Siemens Aktiengesellschaft, Berlin and Munich, Germany

[22] Filed: Oct. 27, 1970

[21] Appl. No.: 84,337

[30] Foreign Application Priority Data

Oct. 27, 1969 Germany....................P 19 54 043.3

[52] U.S. Cl...............................179/18 J, 340/166 R

[51] Int. Cl...............................H04f 3/00

[58] Field of Search..............................179/18 J

[56] References Cited

UNITED STATES PATENTS

| | | | |
|---|---|---|---|
| 3,265,815 | 8/1966 | Bartlett | 179/18 J |
| 3,319,008 | 5/1967 | Kneisel | 179/18 J |
| 3,366,741 | 1/1968 | Kneisel | 179/18 J |
| 3,366,743 | 1/1968 | Darre | 179/18 J |
| 3,475,560 | 10/1969 | Kneisel | 179/18 J |
| 3,499,120 | 3/1970 | Fischer | 179/18 J |

*Primary Examiner*—Harold I. Pitts
*Attorney*—Birch, Swindler, McKie & Beckett

[57] ABSTRACT

A time division communication system which provides means for connecting the information in a pulse frame on an incoming telephone line to the next free time channel in a pulse frame on an outgoing line. A quasi-isosynchronous operation within the switching network provides the necessary storage capacity and delay means to effect the information transfer.

6 Claims, 1 Drawing Figure

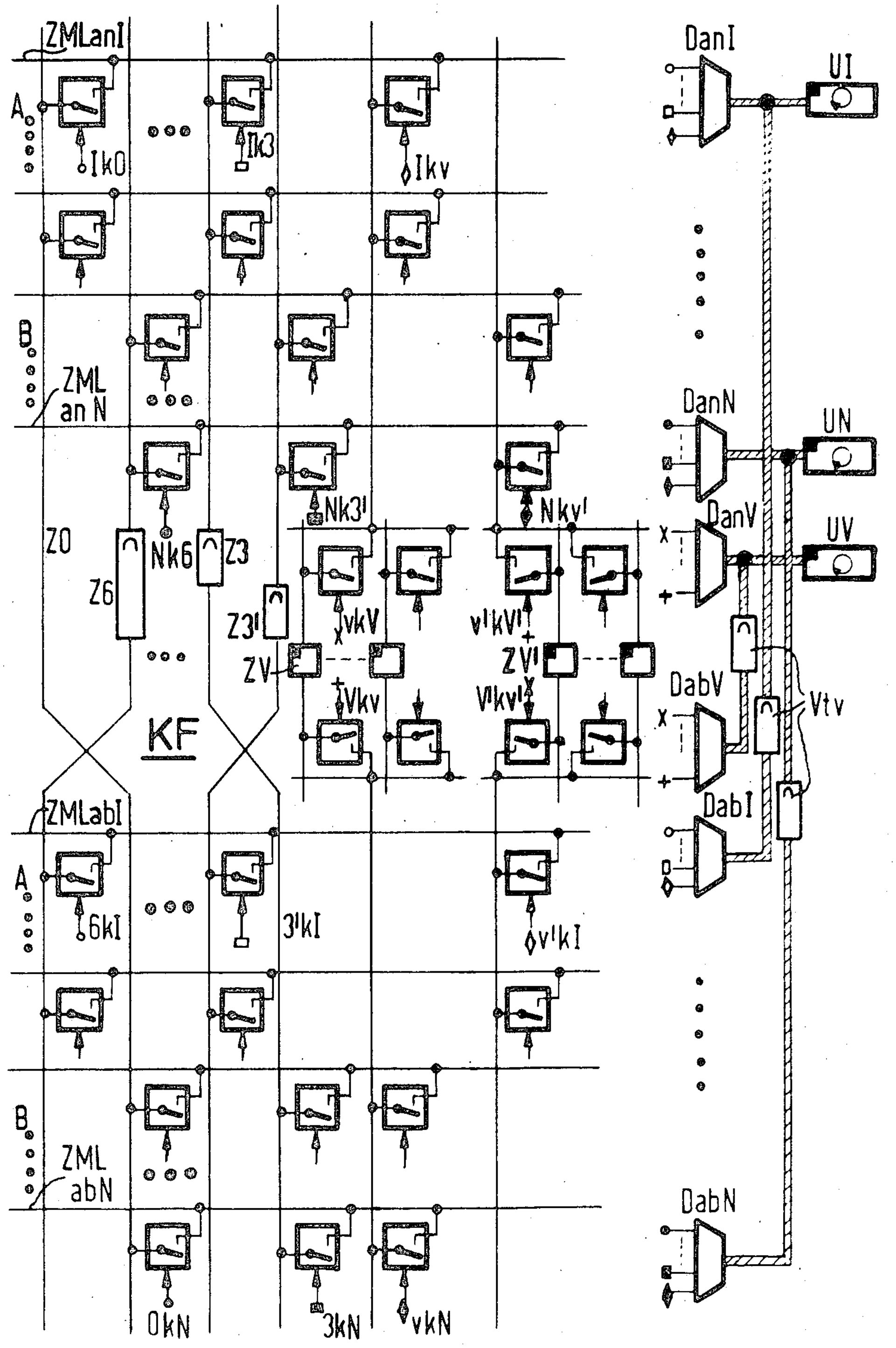
ZMLanI
A
Ik0
Ik3
Ikv
DanI
UI
B
ZML an N
DanN
UN
Nk3'
Nkv'
DanV
UV
Z0
Z6
Nk6
Z3
Z3'
vkV
v'kV'
ZV
ZV'
Vkv
V'kv'
DabV
Vtv
KF
ZMLabI
DabI
6kI
3'kI
v'kI
ZML abN
DabN
0kN
3kN
vkN

SWITCHING CENTER FOR PCM- TIME MULTIPLEX TELEPHONE NETWORK

BACKGROUND OF THE INVENTION

This invention is directed to a switching network for a telephone communication system and more particularly to one for use with a pulse code modulated time multiplex switching system. In conventional communications, especially telephone switching systems transmission of periodically continuous analog signals takes place in transmission channels separated from each other in space. Newer telephone switching systems make use of time multiplexing wherein periodically discontinuous analog signals are transmitted. In a further recent development, information is transmitted via periodically discontinuous digital signals using pulse code modulation (PCM) at periodic successive points in time the instantaneous values of the amplitude of the speech signals are protrayed through binary words, which are then transmitted.

The fundamental purpose of a PCM - time multiplex switching center is to insert the binary word information arriving in time channels on PCM - time multiplex lines into time channels on outgoing time multiplex lines selected according to the desired final connection. The PCM time - multiplex lines arriving and departing from the switching center involve four-wire operation i.e., in connecting the information through, each transmission direction shall be considered separately.

PCM - communication networks have a multiplicity of PCM - time multiplex switching centers. These are generally operated synchronously, i.e., first with the same bit frequency and then, by using frame or loop equalization mentioned below, also with the same phase position within each pulse frame or loop. This exchange pulse frame, or loop, can be achieved, for example, in the way of synchronization through a so called phase middling (see for example NTZ 1968, 533–539). At any given moment the same time channel inside the pulse loop or frame based on the exchange pulse loops of the pertinent switching center on the center side is usually (with consideration for the technical control simplification pertaining to the correlation of the time channels for both transmitting directions used in the individual time multiplex switching centers) used for the transmission of binary words, which are to be transmitted in the course of a telephone conversation, over four wire operated PCM - time multiplex lead which is connected to such a switching center, in both transmitting directions. (See for example, Proceedings, I.E.E., 111 (1964) 12, 1976–1980, 1976). Additionally a so called isosynchronous operation is frequently envisioned inside the individual PCM time multiplex switching centers in which a through connection for both transmitting directions occurs concurrently. A so-called frame or loop equalization is undertaken through applying corresponding time delay means individually to the PCM - receiving - time multiplex leads leading to the PCM - time multiplex switching center. At any given time, seen from the point of the given switching center, the total time elapsed on the pertinent PCM - time multiplex lead between this switching center and the pertinent neighboring switching center is supplemented to a complete multiple of the system scanning period in which the pulse code modulated amplitude samples are derived. Thus the pulse frames of all the PCM - receiving - time multiplex leads which lead to a PCM - time multiplex switching center are synchronized with each other as well as with the pulse frames of all PCM - sending - time multiplex leading away from this switching center and transferred through the exchange pulse frame of the pertinent PCM - time multiplex switching center. (PCBSTJ XXXVIII (1959) 4, 909–932, 922; Proceedings I.E.E., 111 (1964) 12, 1976–1980, 1976; Proceedings I.E.E., 113 (1966) 9, 1420–1428, 1421). In connection with the above described, frame equilization and equilization of temperature conditional duration oscillation may suitably be undertaken at the same time (see for example Proceedings I.E.E., 113 (1966) 9, 1420–1428, 1421).

A fundamental problem in the switching of telephone connections routed over PCM - time multiplex leads is that in certain instances a change of time channel must be undertaken concurrently with the through switching of a connection in a PCM - time multiplex switching center; this is to allow for the regular differentiable occupation of the time channels on the pertinent PCM - time multiplex lead leading into and away from the switching center. In prior art switching matrices for isosynchronous operation the PCM - time multiplex switching center connects the switching matrix inputs and outputs with intermediate line pairs having different measured pairs of complimentary storage times (with reference to the system scanning period). The individual through connections are made over a given intermediate line pair that contains the necessary pair of intermediate storages for the channel transfer (see Proceedings I.E.E., 111 (1964) 12, 1976–1980, 1977). The intermediate storages, whose storage time is partly fixed and partly variable are thus distributed to the individual connections for the duration of the information passage.

SUMMARY OF THE INVENTION

This invention is directed to taking up and forwarding of information signals (especially PCM - signals) in a time multiplex switching system connected with at least two separate transmitting lines. The PCM - time multiplex switching center of a time multiplex telephone network is adapted to handle incoming and outgoing information signals. The pulse frames of all the lines leading away from the switching center (sending - time multiplex leads) are synchronized with each other. The pulse frames of all the incoming receiving - time multiplex lines to the switching center are synchronized with each other or among themselves with the help of delay members included in these lines. In establishing a connection through such a switching center, which connection is assigned a certain time channel in the pulse frame of the given incoming lead (receiving - time multiplex lead) the next free time channel in the pulse frame of the possible outgoing leads or those in the pertinent transmitting direction (sending - time multiplex lead) will be assigned. Thus the same relative time channel inside the given pulse frame will be used in transmitting information signals over a transmission distance in both transmission directions connected with such switching center. In this way the added delay members in the incoming leads (receiving - time multiplex leads) in the given switching center are so selected, that the pulse frames on the outgoing leads (sending - time multiplex leads) possess a given time position different from the pulse frames on the incoming leads (receiving - time multiplex leads). In each case the delay time is fixed according to the measure of a desired intermediate time interval between the given assigned time channels. With such a mode of operation a so called quasi-isosynchronous operation is brought about which brings with it the advantage that the intermediate storage to be provided for a time channel transfer in the given switching center can be of relatively small storage capacity.

This invention provides means for achieving further savings in reference to the necessary technical switching expenditure in such a quasi-isosynchronous operation. The invention is directed to a switching arrangement for accurate switching of information signals, especially PCM - signals, in a time multiplex switching system connected with at least two information signals carrying transmission lines in each transmitting direction. In making a connection through such a switching center, the connection is assigned a certain channel in the time frame of the given incoming line (receiving - time multiplex line). The next free time channel in the time frame on the possible outgoing leads in the pertinent transmission direction (sending - time multiplex lead) will also be assigned. Thus the same time channel inside a given pulse frame is used for the transmission of information signals in both transmitting directions. The pulse frame of all the outgoing leads from such a switching center are synchronized among themselves. The pulse frames of all incoming leads in such a switching center, with the help of time delay means added to these leads, are synchronized among themselves or under each other. Thus the time delay means in the incoming leads in the given switching centers are assigned fixed values such that the pulse frames of the leads outgoing from the given switching center possess a given time position different from the pulse frame of the incoming leads to the switching center, through a fixed delay time (pulse frame delay time) according to the assigned length of a desired intermediate time interval between the given assigned time channels, as explained in German Pat. No. DT-P1800726.6–31. A switching arrangement in accordance with this invention is characterized in that, in the connection switching matrix of the switching center, an intermediate lead pair includes different measured pairs of intermediate storage means, which are complimentary to each other in their storage time as referred to twice the pulse frame delay time. Under a known set of operating conditions one intermediate lead of the intermediate lead pair is connected through a coupling point switch means only with a selected receiving - time multiplex lead of a first group of four wire operated PCM - time multiplex leads connected with the switching center, and with a selected sending - time multiplex lead of a second group of four wire like operated PCM time multiplex leads connected with the switching center. The other intermediate lead of the intermediate lead pair is connectable through the coupling point switch means only with a selected receiving - time multiplex lead of the second group of PCM - time multiplex leads, and with a selected sending - time multiplex leads of the first group of PCM - time multiplex leads.

An advantage of the invention is that only a limited number of coupling point switches are required to produce all possible connections between each lead of the first group of four wire like operated PCM - time multiplex leads on the one side of the switching center and each of the second lead group of four wire like operated PCM - time multiplex leads on the other side. A sufficient number of possible connections are thereby provided to satisfy a great number of applications wherein switching technology is applied to the direction of through traffic i.e., the mediation of channels between two time multiplex leads. In another embodiment of the invention an individual lead of one group of four wire operated receiving PCM - time multiplex leads is connected in the switching center and an individual lead of the second group of sending PCM - time multiplex leads through a second intermediate lead, this lead being connected through a second coupling point switch means, and including static intermediate storage devices. Thus the saving on coupling point switches is extended to such intermediate leads as connect the PCM - time multiplex leads with each other through static intermediate storages.

In another embodiment means are provided for the control of coupling point switches means for connecting receiving - time multiplex lead with a designated lead of the intermediate lead pair, and for connecting the pertinent sending - time multiplex leads of the same transmitting line with the other intermediate lead of the intermediate lead pair. A common address circulation storage means is provided, connected to first and second decoders. The first decoder is directly connected between the output of the storage means and the control inputs of the coupling point switches, which connect selected receiving - time multiplex leads with a selected intermediate lead. The second decoder connected to the storage means output is connected through a delay member to control inputs of a coupling point switch which connects the designated sending - time multiplex lead with the designated intermediate leads. The delay time of the delay member is equal to the pulse frame delay time. This embodiment of the invention provides multiple use of the common address circulation storage, as it is known in the time multiplex switching technology (see, for example, German ET-PS 1,243,247, DT-PS 1,207,452). The common storage means, as used herein, controls the coupling point switches on both the input side and output side of the matrix.

In another embodiment of the invention, the common address circulation storage and the decoders described above control a further set of coupling point switches which connect a pair of intermediate leads including static intermediate storage means with selected sending and receiving - time multiplex leads. A second common further address circulation storage is envisioned to which the first decoder is directly connected and the second decoder is connected through a delay member whose delay time is equal to the pulse frame delay time. These decoders in turn control the state of the further coupling point switches. This embodiment of the invention provides multiple use of the address circulation storage which also controls the coupling point switches of the time multiplex switching matrix in distributing the intermediate storages with variable storage time.

DETAILED DESCRIPTION OF A PREFERRED EMBODIMENT

The invention is now explained in greater detail with reference to the drawing. The drawing shows, to the extent necessary for understanding of the invention, a PCM - time multiplex switching center. Four wire like operated time multiplex leads (transmission lines), including a PCM receiving time multiplex lead, ZMLanI, and a PCM sending time multiplex lead ZMLabI, are connected through the switching center with other four wire like operated time multiplex leads (transmission lines) for example, with PCM receiving time multiplex lead ZMLanN and sending time multiplex lead ZMLabN. It can thus be seen that the time multiplex leads ZMLanI/ZMLabI and ZMLanN/ZMLabN shown in the drawings, belong to two separate groups of four wire like operated time multiplex leads (transmission lines). A connection between a time multiplex lead of the group ZMLanI/ZMLabI and a time multiplex lead of the group ZMLanN/ZMLabN is made by means of intermediate lead pairs Z0/Z6...Z3/Z3'. These intermediate lead pairs include a pair of intermediate storage means, whose storage times are complimentary to each other, as referred to twice the pulse frame delay time of the duration, for example three timefold, around the pulse frames of the sending - time multiplex leads ZMLabI...ZMLabN as opposed to the pulse frames of the receiving - time multiplex leads ZMLanI...ZMLanN are offset to each other, as desclosed in the German Pat. No. DT-PS 1,800,726. One intermediate lead Z0...Z3 of the individual intermediate lead pair Z0/Z6...Z3/Z3' is connected on the input side over coupling point switch IkO with individual receiving - time multiplex lead ZMLanI of the first group of PCM - time multiplex leads ZMLanI/ZMLabI. A coupling point switch transmits incoming information as is explained more clearly below in those periodically successive time divisions within the pulse frame on the designated receiving - time multiplex lead which are produced during the allocated time channel of the designated connection of the receiving time multiplex lead connected through the coupling point switch. On the output side the designated intermediate lead Z0...Z3 of the individual intermediate lead pair Z0/Z6...Z3/Zd.: is connected with the individual sending - time multiplex leads ZMLanN of the second group of PCM - time multiplex leads ZMLanN/ZMLabN over the coupling point switch OkN. This coupling point switch transmits the periodic successive time divisions which are applied through allocated time channels into a frame connected through the switch to a designated sending time multiplex lead. The other intermediate lead Z6...Z3' of the individual intermediate lead pairs Z0/Z6...Z3/Zd.: is connected on the input side with the individual receiving - time multiplex leads ZMLanN of the second group of PCM - time multiplex leads ZMLanN/ZMLabN over coupling point switch Nk6. It is connected on the output side with the individual sending - time multiplex leads ZMLabI of the first group of PCM - time multiplex leads ZMLanI/ZMLabI over coupling point switch 6kI. Thus in accord with the four wire like operation of the time multiplex leads, at any given time one pair of intermediate leads is connected each of the PCM - time multiplex leads of the two groups of PCM - time multiplex leads.

The individual receiving - time multiplex leads ZMLanI...ZMLanN of the groups of PCM - time multiplex leads ZMLanI/ZMLabI...ZMLanN/ZMLabN are further connected with the switching center for four wire like operation over coupling point switches Ikv...Nkv'. The individual sending - time multiplex leads ...ZMLabN, ZMLabI... of the groups of PCM - time multiplex leads are further connected with the switching center over coupling point switches vkN...V'kI. The individual time multiplex leads are connected with a further intermediate lead, which in turn is connected with intermediate leads ZV/ZV' including static intermediate storage over coupling point switches vkV, V'kV' and coupling point switches V'kv', Vkv respectively.

To control of those coupling point switches which are connected to a common receiving - time multiplex lead, and those coupling point switches which are connected to the corresponding sending - time multiplex lead, a single common address circulation storage is utilized. Common address circulation storage UI controls coupling point switches Ik0...Ik3, over which the receiving - time multiplex lead ZMLanI is connected with one intermediate lead Z0...Z3 of the individual intermediate lead pair Z0/Z6...Z3/Z3', and controls the coupling point switch 6kI...3'kI, over which the sending - time multiplex lead ZMLabI is connected with the other given intermediate lead Z6...Z3' of the individual intermediate lead pair Z0/Z6... Z3/Z3'. Common address circulation storage UN controls the coupling point switch Nk6...Nk3' coupled to receiving - time multiplex lead ZMLanN, and the coupling point switch 0kN...3kN coupled to sending - time multiplex lead ZMLabN. The addresses of the coupling point switches are entered in the address circulation storage in a way known in time multiplex technology (see, for example, German Pat. Nos. ST-PS 1,243,247; DT-PS 1,207,452). The addresses are located in a place corresponding to the given time channel over which the selected receiving/sending - time multiplex lead is connected with an intermediate lead in the course of routing individual connections over the time multiplex leads. A decoder DanI...DanN is connected on the output side of address circulation storages UI...UN in the known manner. The outputs of the decoders lead to the control inputs of the coupling point switch Ik0...Ik3, Nk6...Nk3', over which the receiving - time multiplex lead ZMLanI...ZMLanN is connected with intermediate leads of the individual intermediate lead pairs Z0/Z6...Z3/Zd.:. In the drawing, this is demonstrated by means of corresponding marks at the outputs of the decoders and at the control inputs of the pertinent coupling point switches. In addition, a second decoder DabI...DabN is connected to the output side of each of the address circulation storages UI...Un over a delay member Vtv. The delay time of the delay member Vtv is equal to the pulse frame delay time tv, in order that in the manner disclosed in German Pat. No. DT-PS 1,800,726 the pulse frames of the sending - time multiplex leads ZMLabI...ZMLabN are offset or moved with respect to the timing of the pulse frames of the receiving - time multiplex leads ZMLanI...ZMLanN. The outputs of said second decoders DabI...DabN lead, as is shown in the drawing through corresponding marks to the control inputs of the coupling point switches 6kI...3'kI, 0kN...3kN, over which the designated sending - time multiplex lead ZMLabI...ZMLabN is connected with the desired intermediate leads of intermediate lead pairs Z0/Z6...Z3/Z3'.

Under the control of the coupling point addresses momentarily stored in the address circulation storages UI...Un, designated coupling point switches are periodically momentarily closed, establishing the desire time channel. Assuming that — considering one direction of transmission — a signal coming in over the receiving - time multiplex lead ZMLanI should be forwarded over the sending - time multiplex lead ZMLabN, the signal on the sending - time multiplex lead ZMLabN is assigned a time channel which coincides in time with the time channel assigned to the connection on the receiving time multiplex lead ZMLanI. The address of the coupling point switch IkO is written in the circulation storage UI into that circulation phase which corresponds to that of the pertinent signal in the time channel assigned to the receiving - time multiplex lead ZMLanI. Coupling point switch IkO is henceforth activated periodically to transmit the information in this time channel transmitted on the receiving - time multiplex lead ZMLanI to the intermediate lead Z0 of the intermediate lead pair Z0/Z6. In order to transmit this information to the sending - time multiplex lead ZMLanN, the coupling point switch OkN must be activated simultaneously with the activation of coupling point switch IkO. To accomplish this its address is written in the address circulation storage UN and at a circulation phase which precedes the circulation phase at which the address of the coupling point switch IkO is written in the address circulation storage UI, by the delay time of the delay member Vtv connected to the output side of the address circulation storage UN, that is by the pulse frame delay time tv. Recording these two coupling point switch addresses established the through switching of the signal in the direction of transmission, namely from the receiving - time multiplex lead ZMLanI to the sending - time multiplex lead ZMLabN. Moreover, the through switching of signals in the other transmission direction, namely from receiving - time multiplex lead ZMLanN to the sending - time multiplex lead ZMLanI, is also established. As indicated by the corresponding markings on the drawings, the same address written in circulation storage UI which controls the coupling point switch IkO through the decoder DanI, also controls the coupling point switch 6kI through the decoder DabI, after a delay equal to the delay duration tv of the delay member Vtv. In the same manner, the same address stored in the circulation storage UN which controls the coupling point switch OkN through the decoder DabN, also controls the coupling point switch Nk6, through the decoder DanN, although earlier by the amount of the delay duration tv.

The result of this is that a time period is established between the time of activation of coupling point switch Nk6 and the time of activation of coupling point switch 6kI which is equal to twice the pulse frame delay time tv and which is bridged thru the delay member lying in the intermediate lead Z6. Assume, for example, that the pulse frame delay time tv, and, the corresponding individual delay times of the delay members Vtv, have a duration of three time divisions. The coupling point switch IkO in the exemplary embodiment disclosed herein is activated in the 20th time division of the pulse frame which is controlling for the receiving - time multiplex leads ZMLanI...ZMLanN. The time channel switch Okn is activated in the same time division which in taking consideration of the named pulse frame delay time of three time divisions, represents the 17the time division of the pulse frame which is controlling for the sending multiplex leads ZMLabI...ZMLabN. The coupling point switch nk6 is activated in the 17th time division of the pulse frame which is controlling for the receiving - time multiplex leads ZMLanI...ZMLanN. Finally, the activation of coupling point switch 6kI is delayed by six time divisions as compared to the activation point of the coupling point switch Nk6 and thereby occurs in the 20th time division of the pulse frame which is determining for the sending - time multiplex leads ZMLabI...ZMLabN. Thus the same time channel within the given pulse frame is used on each transmission line in both transmission directions.

The switching arrangement of this invention may be utliized in a corresponding manner in applications wherein smaller time separations between time channels on the two transmission distances are to be used. Some connections may be made over other intermediate lead pairs which are not shown in detail on the drawings. If the same time channel can be used in both transmission directions, the connection is routed over the intermediate lead pair Z3/Z3' which is disclosed in the drawing in a manner corresponding to the above explained apparatus. A pair of delay members are utilized herein whose delay time is equal to a pulse frame delay time tv, of for example, three time divisions.

It can also be seen from the drawing that the address circulation storages UI...UN and the decoders DanI...DanN, DabI...DabN which are connected to their outputs can also control coupling point switches Ikv...Nkv', v'kI...vkN. Using these switches, receiving - time multiplex leads ZMLanI...ZMLanN and sending - time multiplex leads ZMLabI...ZMLabN are connected through a further intermediate lead and thence through first further coupling point switches vkV, v'kV',... and second further coupling point switches V'kv', Vkv,...respectively, with intermediate lead pairs ZV/ZV'. These intermediate lead pairs include pairs of static intermediate storage means for the received information. This static storage provides storage times which are greater than twice the pulse frame delay time. The coupling point switches Ikv...Nkv',v'kI...vkN are controlled in a manner which corresponds to the above explained processes, so that further explanation thereof is superfluous. For the control of the named first and second further coupling point switches Vkv,v'kv')) AND V'kv', Vkv,... a further address circulation storage UV is provided in the switching arrangement shown in the drawing. A first decoder DanV is directly connected to the output of storage UV, and a second decoder DabV is connected to the output over a delay member Vtv whose delay time is equal to the pulse frame delay time tv. The outputs of the first decoder DanV lead to the control inputs of the first further coupling point switches vkV, v'kV'...; the outputs of the second decoder DabV lead to the control inputs of the second further coupling point switches V'kv', Vkv,... . In this manner two coupling point switches of an intermediate lead pair which are offset in time to each other by the pulse frame delay time are controlled by the same address written in address circulation storage UV. This is shown in the drawing thru corresponding marks, for example, on coupling point switches vkV and V'kv'. Thus if a signal is connected over an intermediate lead pair containing static intermediate storages, as for example the intermediate lead pair ZV/ZV', the information is handled in a manner which corresponds fully to the above explained processes in the control, for example of the coupling point switches Ikv, Nkv', v'kI, vkN. The addresses of the further coupling point switches described here are written in the address circulation storages UV in circulation phases corresponding to those in the address circulation storages UI...UN in which the coupling point switch addresses in question are written so that also the further coupling point switches are activated to the correct time channel. These processes take place analogously to the previously explained processes, so that further explanations is superfluous.

The above explanations are based on a pulse frame delay time of the duration of three time divisions. In similar fashion, a switching arrangement or circuit arrangement in accordance with the invention can take into account other pulse frame delay times greater or smaller. If the pulse frame delay time is exactly 0, the one delay member which is connected at the output of the one address circulation storage is omitted, and the second delay member can be combined or coincident with the first decoder.

It should be noted that a switching arrangement or circuit arrangement in accordance with the invention can be applied to a multiple step coupling network, as is disclosed, for example in the Zolloque International de Commutasion Electronique, Paris 1966, page 472. The possibility is here disclosed of drawing every transmission line, at least in some cases, into one group or another of PCM - time multiplex leads connected with a switching arrangement developed in accordance with this invention without additional expenditure in switching circuitry.

The embodiments of the invention and process descriptions thereof set forth hereinabove are considered to be only exemplary, and it is contemplated that changes and modifications may be made thereto within the scope of the appended claims.

I claim:

1. A switching arrangement for the thru switching of pulse code modulated information signals in a time multiplex switching center of a pulse code modulated time multiplex telephone network connected with a plurality of telephone lines which carry separate PCM information signals, wherein the information arriving over one of said telephone lines assigned to a certain time channel in the pulse frame of the incoming receiving - time multiplex telephone line is assigned to the next free time channel in the pulse frame on a sending time multiplex line in the pertinent direction of transmission, the same time channel being used for the transmission of information signals in both directions of transmission over the telephone lines connected with the switching center, wherein the pulse frame in the sending telephone lines are synchronized and in which the pulse frames of all incoming receiving lines are synchronized by means of delay members in these lines, the delay members in the incoming receiving telephone lines having a fixed predetermined value such that the pulse frames of the outgoing sending telephone lines possess an assigned differentiable time position with respect to the pulse frames of the incoming receiving lines, the switching being carried out through a fixed delay means assigned according to the desired total time difference between information positions in frames on incoming and outgoing telephone lines, including a connection switching matrix (KF), a plurality of intermediate lead pairs (Z0/Z6...Z3/Z3') including intermediate storage means having complimentary storage times with reference to twice the pulse frame delay time, first coupling point switch means (IkO, OkN) for selectively connecting a first intermediate lead of (Z0) one of said intermediate lead pairs (Z0,Z6) with a selected receiving telephone line (ZMLanI) of a first group (ZMLanI/ZMLabI) of four wire like operated PCM - time multiplex leads (ZMLanI/ZMLabI...; ...ZMLanN/ZMLabN) connected to said switching center and with a selected sending telephone line (ZMLabN) of a second group (ZMLamN/ZMLabN) of the four wire like operated PCM - time multiplex lines ZMLanI/ZMLabI...; ...ZMLanN/ZMLabN) connected to said switching center, and second coupling point switch means (Nk6, 6kI) for connecting a second intermediate lead (Z6) of said intermediate lead pair (Z0/Z6) with a selected receiving time multiplex lead (ZMLanN) of the second group (...ZMLanN/ZMLabN) of PCM - time multiplex lines and with a selected sending time multiplex line (ZMLabI) of the first group (ZMLanI/ZMLabI...) of PCM - time multiplex lines.

2. The switching arrangement of claim 1 including means for controlling said first (Ik0...Ik3) and second (6kI...3'kI) coupling point switch means including an address circulation storage means (UI), a first decoder (Dan I) connected between the output side of said address storage and control inputs of said first coupling point switch means, a second decoder connected to control inputs of said second coupling point switch means, and a delay member coupled between said address circulation storage means and said second decoder, said delay member having a delay time equal to the pulse frame delay time.

3. The switching arrangement of claim 1 including second intermediate storage means (ZV/ZV') and third coupling point switch means (vkV, v'kV'...V'kv', Vkv) for connecting said second intermediate storage means to a selected receiving line (ZMLanI/ZMLanN) of the first group of four wire like operated PCM - time multiplex leads (ZMLanI/ZMLabI...;...ZMLanN/ZMLabN) and a selecting sending line (...ZMLabN; ZMLabI ...) of the second group of PCM sending lines.

4. The switching arrangement of claim 3 including means for controlling said first (IkO...Ik3) and second (6kI...3'kI) coupling point switch means including an address circulation storage means (UI), a first decoder (Dan I) connected between the output side of said address storage and control inputs of said first coupling point switch means, a second decoder connected to control inputs of said second coupling point switch means, and a delay member coupled between said address circulation storage means and said second decoder, said delay member having a delay time equal to the pulse frame delay time.

5. The switching arrangement of claim 2 comprising third intermediate lead members, third coupling point switch means (Ikv; v'kI) interposed between said third intermediate lead members and said receiving - time multiplex line (ZMLanI) and sending - time multiplex line (ZMLabI), said third coupling point switch means being responsive to said first address circulation storage means (UI) and said first and second decoders, static intermediate storage means, fourth coupling point switch means (vkV, v'kV') for coupling said static storage means to said intermediate lead members, and means for controlling the state of said fourth coupling point switch means.

6. The switching arrangement of claim 5 wherein said means for controlling the state of said fourth coupling point switch means includes a second address circulation storage means (UV)

a third decoder connected between the output of said address circulation storage means and control inputs of said fourth coupling point switch means, a fourth decoder connected to the control inputs of said fourth switch means, and a second time delay member coupled between said second address circulation storage means and said fourth decoder and having a delay time equal to said pulse frame delay time.

* * * * *